US012321136B1

(12) United States Patent
Wu

(10) Patent No.: US 12,321,136 B1
(45) Date of Patent: Jun. 3, 2025

(54) WATERPROOF STRUCTURE FOR WATCH

(71) Applicant: Shenzhen Amazwear Technology CO., LTD., Shenzhen (CN)

(72) Inventor: Xianghua Wu, Wuhan (CN)

(73) Assignee: Shenzhen Amazwear Technology CO., LTD., Shenzhen (CN)

(*) Notice: Subject to any disclaimer, the term of this patent is extended or adjusted under 35 U.S.C. 154(b) by 0 days.

(21) Appl. No.: 19/008,841

(22) Filed: Jan. 3, 2025

(51) Int. Cl.
*G04B 37/11* (2006.01)
*G04B 37/10* (2006.01)

(52) U.S. Cl.
CPC .......... *G04B 37/113* (2013.01); *G04B 37/106* (2013.01)

(58) Field of Classification Search
CPC .... G04B 37/113; G04B 37/106; G04B 3/043; G04B 19/283; G04B 19/18; G04B 3/048
See application file for complete search history.

(56) References Cited

U.S. PATENT DOCUMENTS 10,025,273 B2 * 7/2018 Iguchi ................ G04B 37/0008
11,435,700 B2 * 9/2022 Hirayama ............ G04B 37/081
11,698,654 B2 * 7/2023 Yamamoto ............ G04C 3/001 368/276
2023/0048160 A1 * 2/2023 Navellou ........... A61B 5/02438

* cited by examiner

*Primary Examiner* — Edwin A. Leon
(74) *Attorney, Agent, or Firm* — Birchwood IP

(57) ABSTRACT

A waterproof structure for watch is provided, which includes a watch case, a watch cover, a bottom case, and a circuit module. The watch cover is fixedly provided on one side of the watch case, the bottom case is fixedly provided on the other side of the watch case, and the circuit module is provided within the watch case. A display screen is provided between the watch case and the watch cover, and a first sealing ring is provided between the watch cover and the display screen. The first sealing ring is fixedly provided on the watch cover and abuts against the display screen, rendering it difficult for moisture to enter an interior of the watch and damage the circuit module through a connection position between the watch cover and the display screen, thereby improving a connection sealing between the water cover and the display screen.

5 Claims, 17 Drawing Sheets

WATERPROOF STRUCTURE FOR WATCH

TECHNICAL FIELD

The present disclosure relates to the field of watches technologies, and in particular, to a waterproof structure for a watch.

BACKGROUND

With the development of technology and an improvement of people's living standards, watches, as an existing tool, are worn by people on their hands. Nowadays, most watches include a case, a watch cover installed on the case, and an integrated circuit board installed inside the case, because the requirements for waterproof performance of watches have also increased accordingly.

The waterproofing of existing watches is generally achieved by tightly fitting the case structure of the watch to prevent moisture from entering an interior of the watch and damaging the circuit board, especially the waterproofing between the display screen and the watch cover, which is usually done by fixing the display screen with glue, that is, bonding the watch cover together with adhesive.

Regarding the relevant technologies mentioned above, waterproofing is achieved by fixing the display screen with adhesive, that is, by bonding the watch cover together with glue, the waterproof performance between the watch cover and the display screen is low, which renders it easy for moisture to enter the interior of the watch from the connection position between the watch case and the display screen, thereby causing damage to the watch.

SUMMARY

In order to improve the sealing between a watch case and a display screen, the present application provides a waterproof structure for a watch.

The waterproof structure of the watch provided in the present application adopts the following technical solution.

The waterproof structure for a watch, including a watch case, a watch cover, a bottom case, and a circuit module; where the watch cover is fixedly provided on one side of the watch case, the bottom case is fixedly provided on the other side of the watch case, and the circuit module is provided within the watch case; a display screen is provided between the watch case and the watch cover, and a first sealing ring is provided between the watch cover and the display screen; the first sealing ring is fixedly provided on the watch cover and abuts against the display screen.

By adopting the above technical solution, providing the first sealing ring renders it difficult for moisture to enter an interior of the watch and damage the circuit module through a connection position between the watch cover and the display screen, thereby improving an airtightness of a connection between the watch cover and the display screen, enhancing an overall waterproof performance of the watch, and improving the waterproof performance only through a tight structural fit of the watch case. However, the waterproof sealing between the watch case and the display screen is not easily achieved through structural fit, which leads to moisture easily entering the interior of the watch from the connection position between the watch case and the display screen, causing damage to the watch. Furthermore, a connection structure between the watch cover and the display screen is transitioned through the first sealing ring, which renders a soft elasticity of the first sealing ring play serve as a buffer and shock absorbing role when the watch falls, preventing collision and damage between the watch cover and the display screen due to watch falling.

In some embodiments of the present application, a connection ring is fixedly provided on a side of the display screen, a thickness of the connection ring is smaller than a thickness of the display screen, the first sealing ring abuts against the connection ring, the watch cover is provided with a display groove, and a side of the display screen abuts against a groove body of the display groove.

By adopting the above technical solution and providing the connection ring, moisture is less likely to enter the interior of the watch case at the connection position between the watch cover and the display screen, thereby further increasing the airtightness of the connection between the watch cover and the display screen, rendering it more user-friendly.

In some embodiments of the present application, a second sealing ring is provided between the watch case and the watch cover, and the second sealing ring is fixedly provided on the watch case or the watch cover and abuts against the watch cover or the watch case.

In some embodiments of the present application, the watch cover includes a first cover body and a second cover body, the second cover body is located between the first cover body and the watch case, the second cover body is fixedly connected to the watch case, the first cover body is provided with a plurality of fixing holes, each of the plurality of fixing holes is threaded with fixing screws, each of the fixing screws respectively runs through each of the fixing holes and threaded connected to the watch case, the first cover body presses the second cover body onto the watch case.

In some embodiments of the present application, each of the fixing holes is provided with protective rings, when each of the fixing screws respectively runs through each of the fixing holes, each of the fixing screws respectively runs through each of the protective rings and abuts against each of the protective rings, and each of the protective rings is respectively wound around each of the fixing screws.

In some embodiments of the present application, the watch case or the watch cover is provided with a second sealing groove, the second sealing ring is threaded and engaged with the second sealing groove; each of the fixing holes is located an outer side a groove body of the second sealing groove.

By adopting the above technical solution, each fixing hole is located on the outside of the groove body of the second sealing groove, rendering it difficult for moisture to permeate into the interior of the watch case through each fixing hole, thereby further increasing a waterproof performance of the second sealing ring and the waterproof performance of the watch, with good usability.

In some embodiments of the present application, a third sealing ring is provided between the first cover body and the second cover body, the third sealing ring is fixedly provided on the first cover body or the second cover body and abuts against the second cover body or the first cover body.

In some embodiments of the present application, a fourth sealing ring is provided between the watch case and the bottom case, the fourth sealing ring is fixedly provided on the watch case or the bottom case and abuts against the bottom case or the watch case.

In some embodiments of the present application, materials of the first sealing ring include silicone, materials of the second sealing ring include silicone, materials of the third sealing ring include silicone, and materials of the fourth sealing ring include silicone.

In summary, the present application includes at least one beneficial technical effect as follows.

Providing the first sealing ring renders it difficult for moisture to enter the interior of the watch and damage the circuit module through the connection position between the watch cover and the display screen, thereby improving an airtightness of a connection between the watch cover and the display screen, enhancing an overall waterproof performance of the watch, and improving the waterproof performance only through a tight structural fit of the watch case. However, the waterproof sealing between the watch case and the display screen is not easily achieved through structural fit, which leads to moisture easily entering the interior of the watch from the connection position between the watch case and the display screen, causing damage to the watch. The connection between the water cover and the display screen is transitioned through the first sealing ring, which renders a soft elasticity of the first sealing ring play a buffering and shockproof role when the watch falls, preventing collision and damage between the watch cover and the display screen due to the watch falling.

2. Providing the connection ring renders it difficult for moisture to enter the interior of the watch case at the connection position between the watch cover and the display screen, thereby further increasing the airtightness of the connection between the watch cover and the display screen, rendering it more user-friendly.

3. Each fixing hole is located on the outside of the groove body of the second sealing groove, rendering it difficult for moisture to permeate into the interior of the watch case through each fixing hole, thereby further increasing the waterproof performance of the second sealing ring and the waterproof performance of the watch, with good usability.

Numeral reference: 1 watch case; 11 button slot; 111 button body; 1111 button sealing ring; 112 button spring; 12 power module; 13 charging rod; 14 speaker; 15 connection block; 151 installation hole; 16 second sealing groove; 17 fourth sealing groove; 2 watch cover; 20 display groove; 21 first cover body; 210 fixing hole; 211 fixing screw; 212 protective ring; 22. second cover body; 221 third sealing groove; 3 bottom case; 301 case portion; 302 central portion; 31 charging port; 311 waterproof hard adhesive; 32 speaker hole; 33 speaker plate; 331 shock-absorbing pad; 4. circuit module; 5 display screen; 51 connection ring; 61 first sealing ring; 62 second sealing ring; 63 third sealing ring; 64 fourth sealing ring.

DESCRIPTION OF EMBODIMENTS

Further, a detailed explanation of the present application will be provided in combination with FIGS. 1-17.

Figure 1:
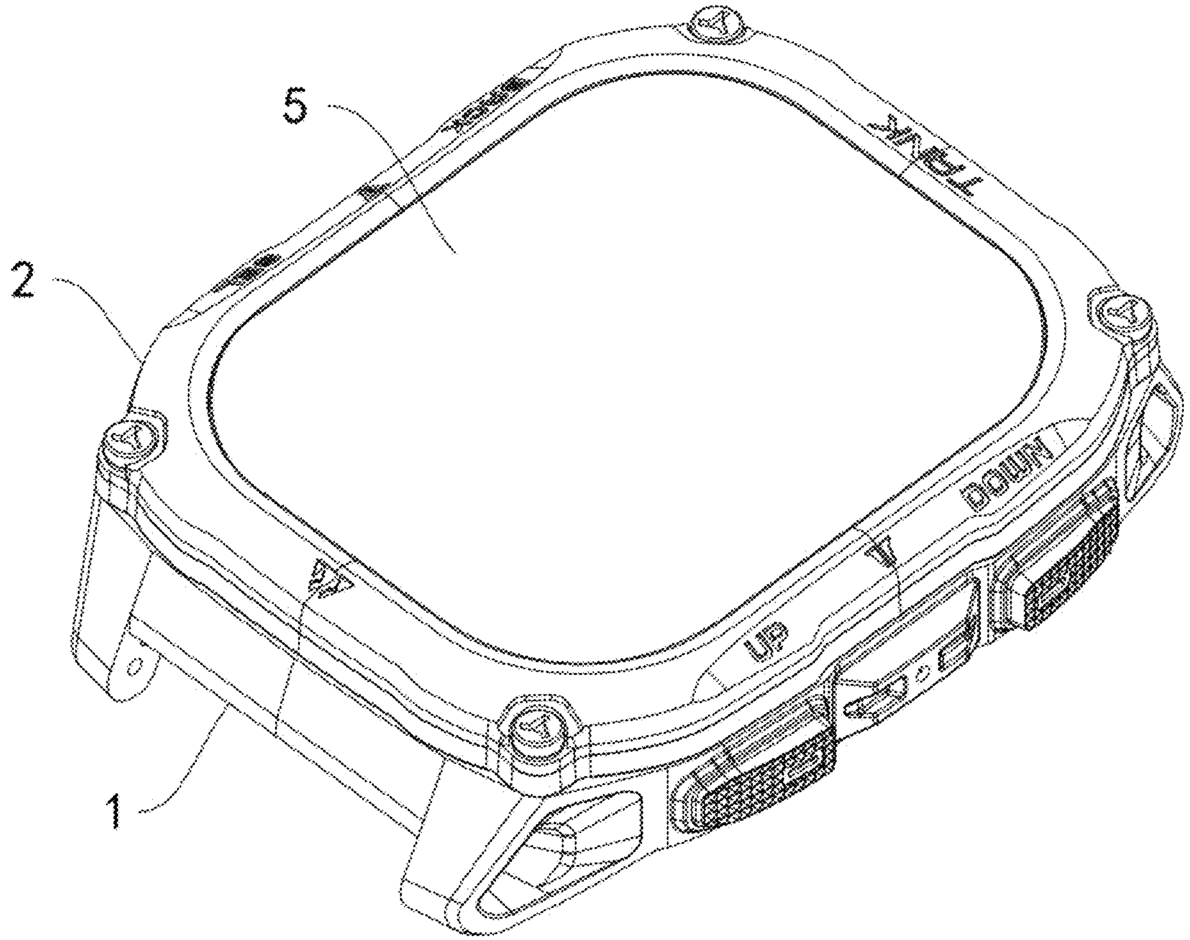
FIG. 1 is a schematic diagram of an overall structure of an embodiment of the present application.
Figure 2:
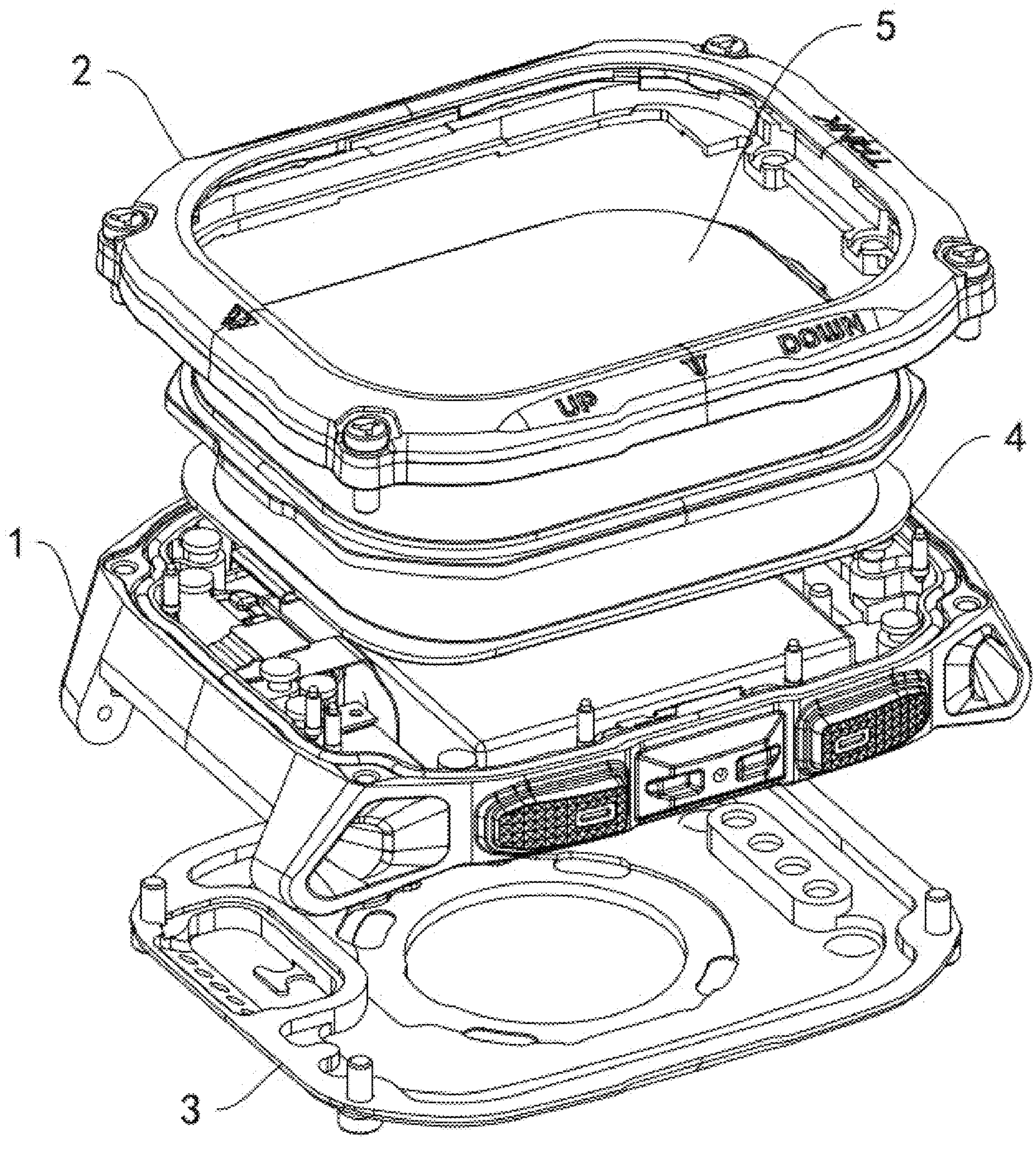
FIG. 2 is an exploded view of the overall structure of the embodiment of the present application.

An embodiment of the present application discloses a waterproof structure for a watch. Referring to FIGS. 1 and 2, the waterproof structure for a watch includes a watch case 1, a watch cover 2, a bottom case 3, and a circuit module 4. The watch case 1, the watch cover 2, and the bottom case 3 are rectangular in shape. The watch cover 2 is fixedly provided on one side of the watch case 1, the bottom case 3 is fixedly provided on the other side of the watch case 1, and the circuit module 4 is provided within the watch case 1.

Figure 3:
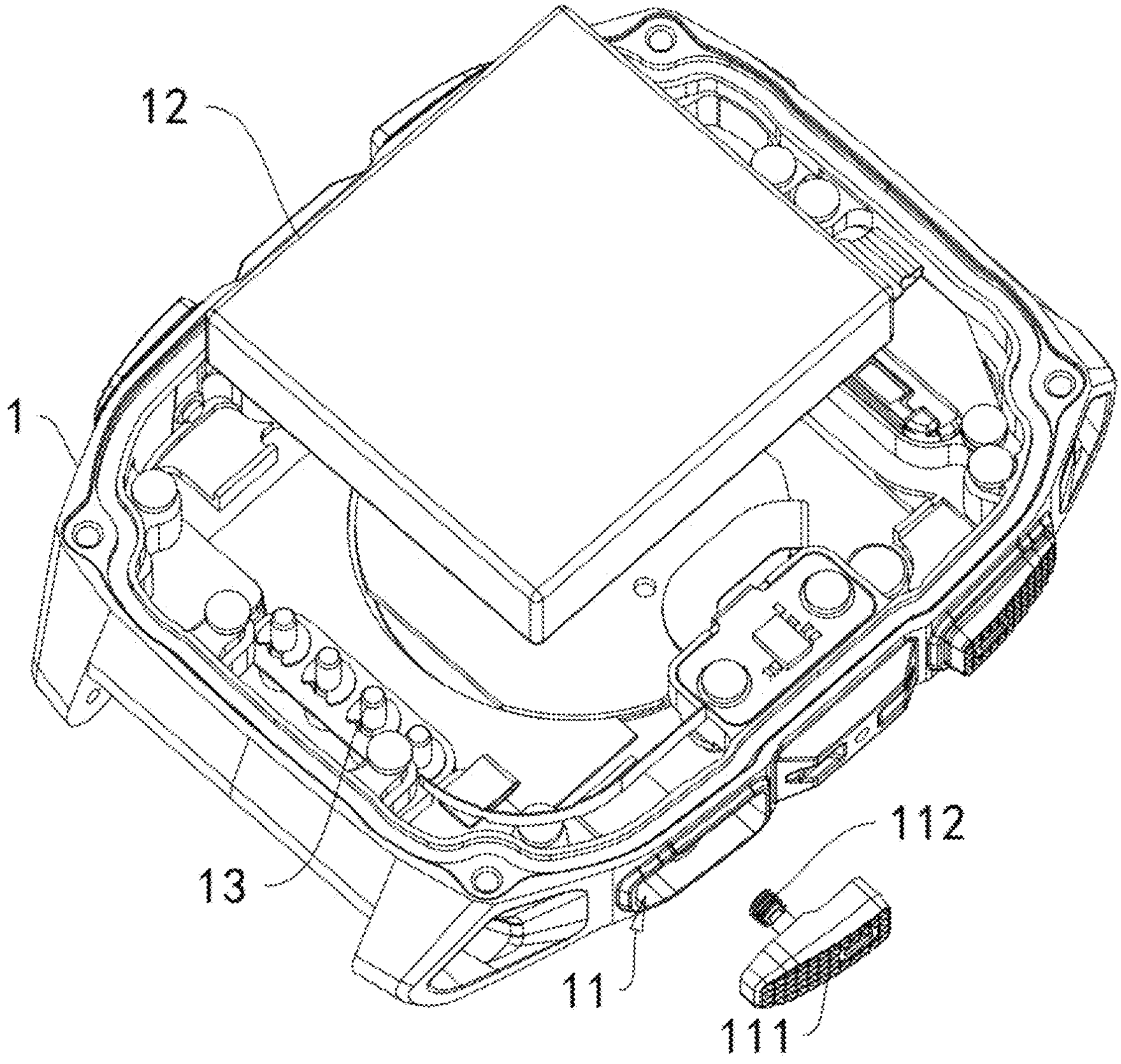
FIG. 3 is an exploded view of a top structure of a watch case in an embodiment of the present application.

Referring to FIGS. 2 and 3, there are a plurality of button slots 11 on an outer side of the watch case 1, each of the plurality of button slots 11 is provided with a button body 111. Button springs 112 are provided between each button body 111 and the watch case 1, one end of each button spring 112 is fixedly connected to each button body 111 and the other end thereof is fixedly connected to the watch case 1. Each button body 111 abuts against buttons of the circuit module 4 and is configured to control and adjust the circuit module 4.

Figure 4:
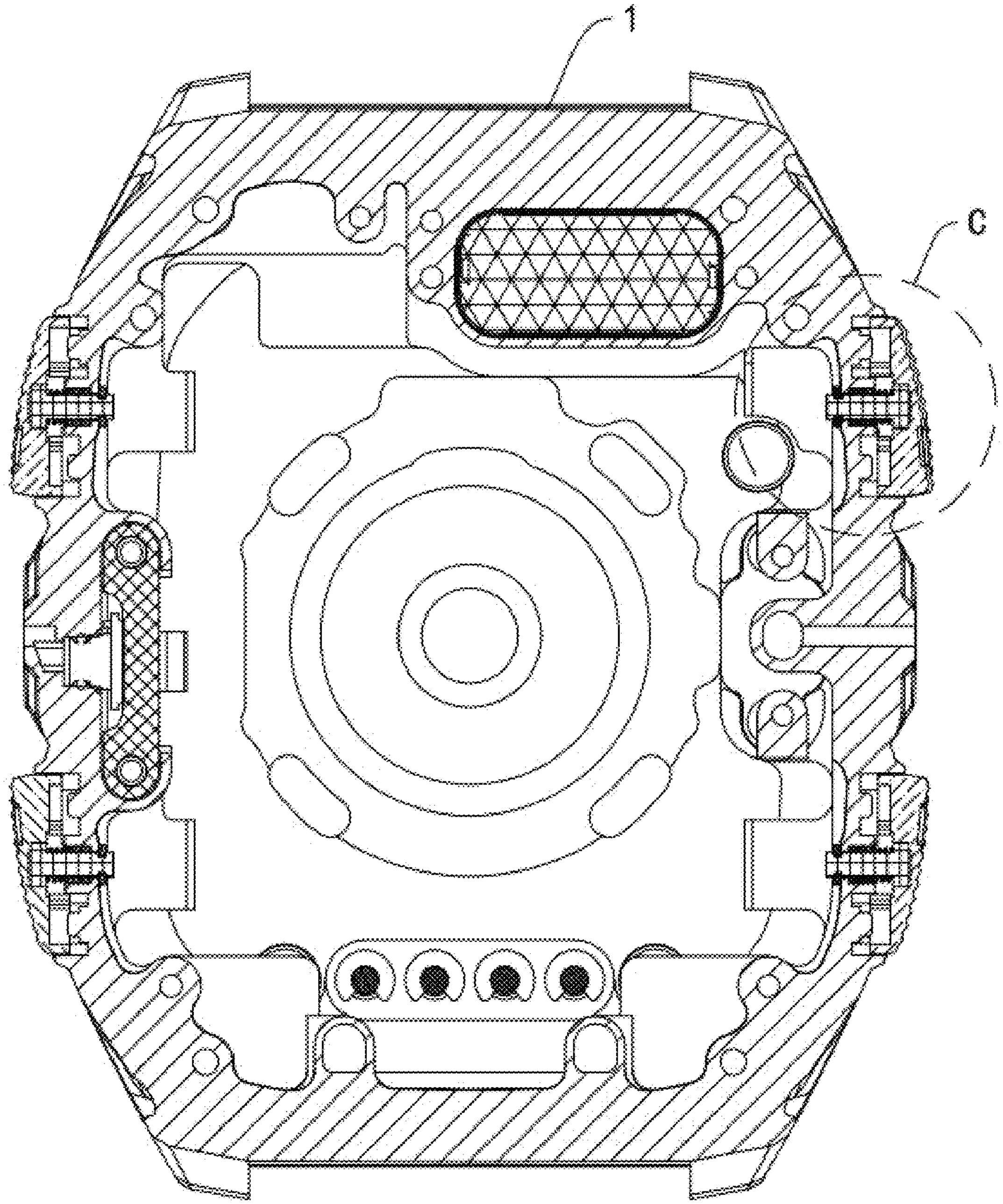
FIG. 4 is a sectional view of the watch case according to an embodiment of the present application.
Figure 5:
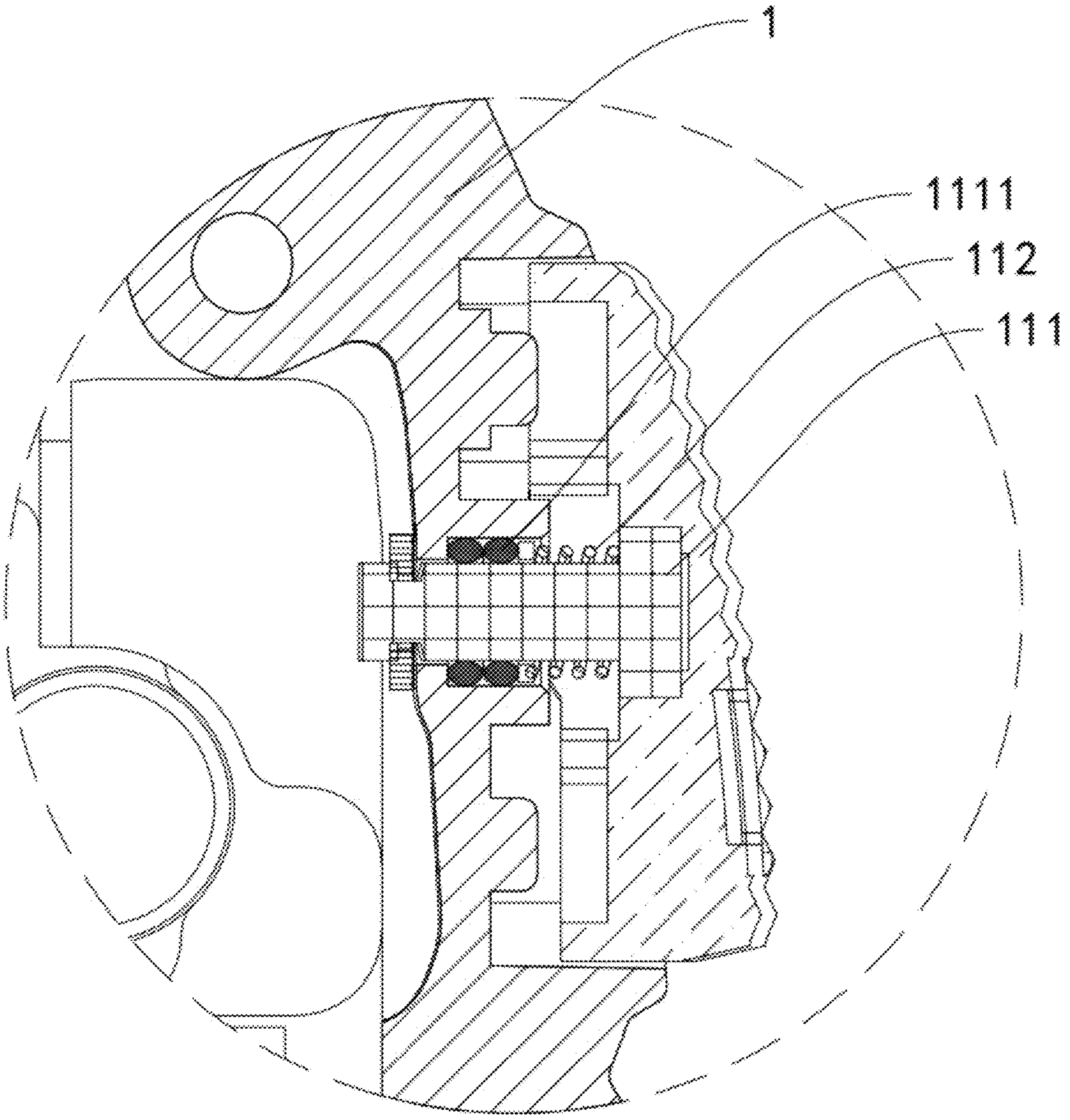
FIG. 5 is an enlarged structural view of part C in FIG. 4.

Referring to FIGS. 4 and 5, an outer periphery surface of the button body 111 is sleeved with two button sealing rings 1111, thereby achieving a waterproof of a connection between the button body 111 and the watch case 1.

Figure 6:
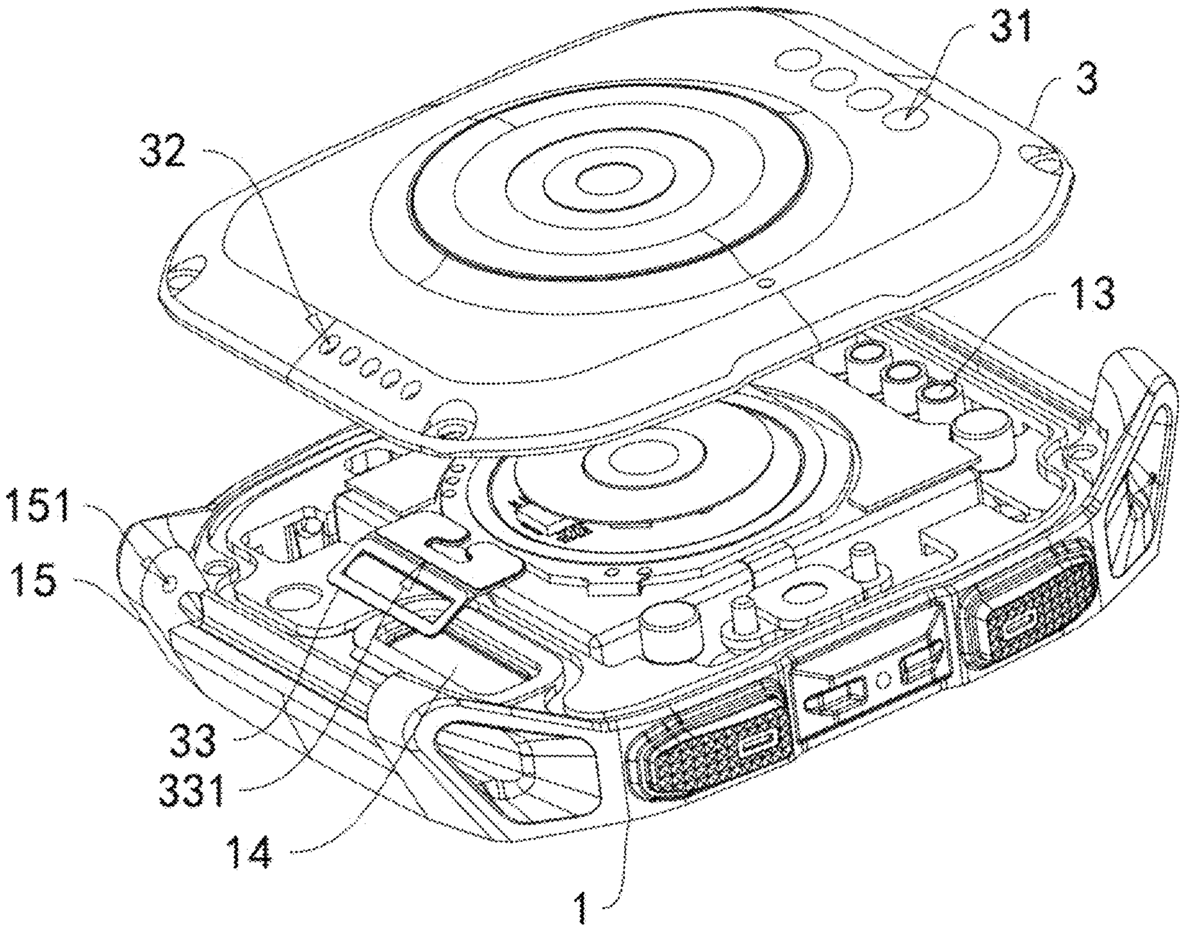
FIG. 6 is an exploded view of a bottom structure of the watch case in an embodiment of the present application.

Referring to FIGS. 3 and 6, a power module 12 is fixedly provided in a middle position inside the watch case 1. The power module 12 is electrically connected to the circuit module 4 and provides electrical energy to the circuit module 4. A plurality of charging rods 13 are also fixedly provided in the watch case 1. The bottom case 3 is provided with a plurality of charging ports 31 that are penetrated. Each charging rod 13 respectively runs through and is clamped to each charging port 31, and each charging port 31 is electrically connected to the circuit module 4 and is configured to charge the power module 12.

Figure 7:
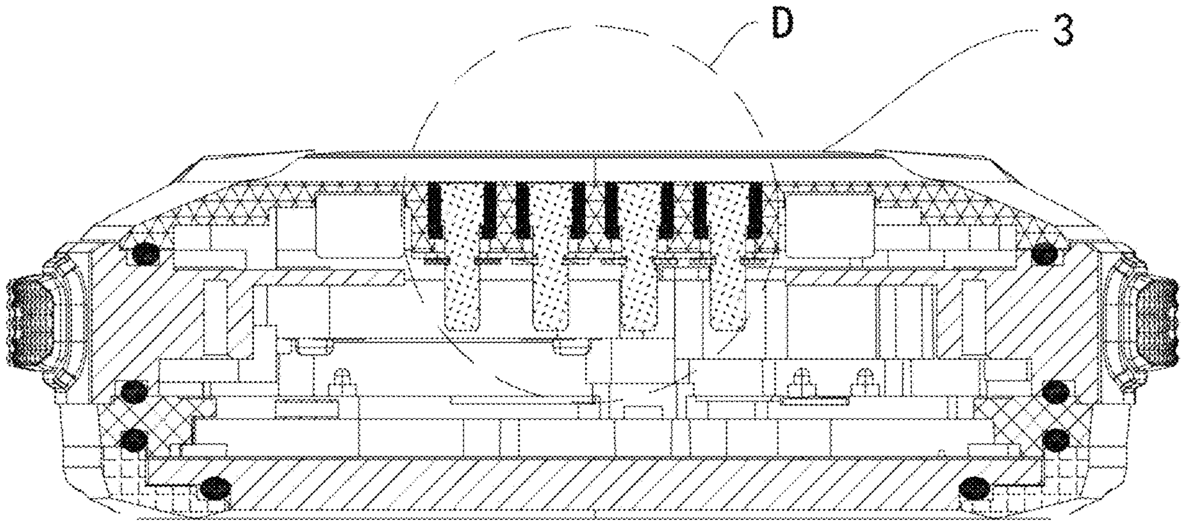
FIG. 7 is a sectional structural view of a charging rod in an embodiment of the present application.
Figure 8:
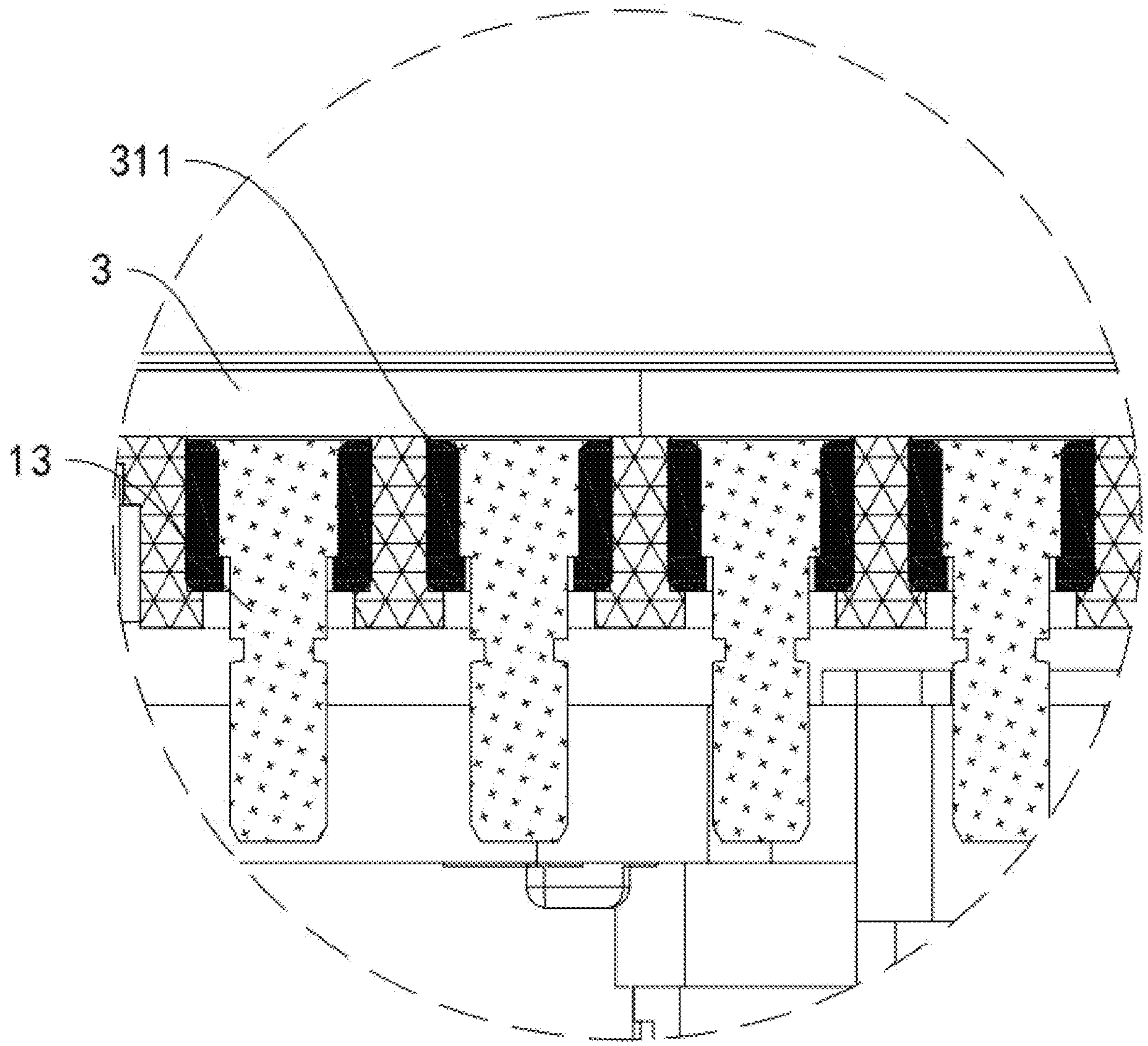
FIG. 8 is an enlarged view of part D of FIG. 7.

Referring to FIGS. 7 and 8, a waterproof hard adhesive 311 is provided between the charging rod 13 and the charging port 31. In an embodiment of the present application, a material of the waterproof hard adhesive 311 is selected as Teflon, so that an extrusion structure of the waterproof hard adhesive 311 is added between the bottom case 3 and the charging rod 13 to increase an interference caused by a deformation of Teflon extrusion, thereby achieving a waterproofing at a connection position between the charging rod 13 and the bottom shell 3.

Figure 9:
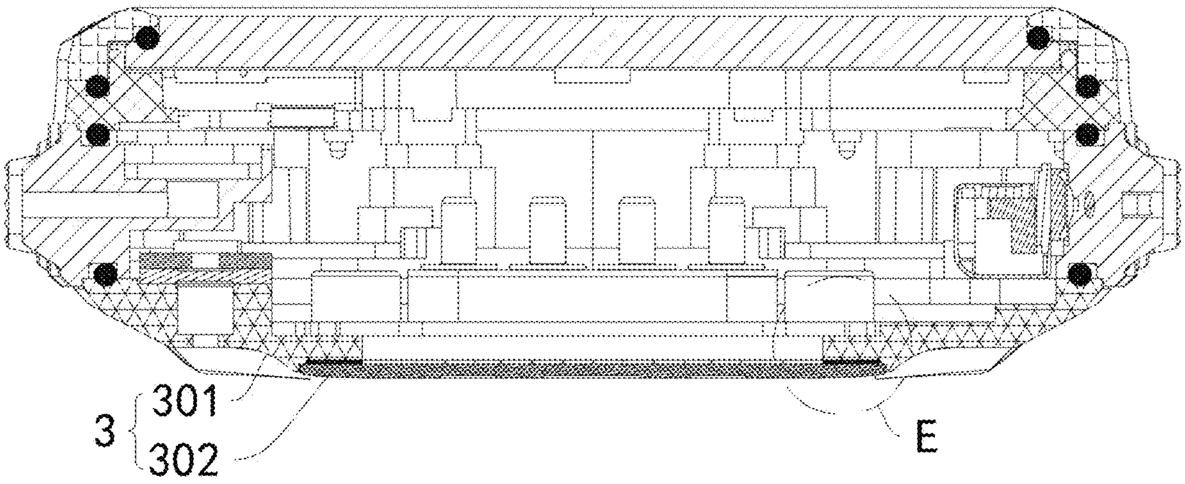
FIG. 9 is a sectional structural view of a bottom case of an embodiment of the present application.
Figure 10:
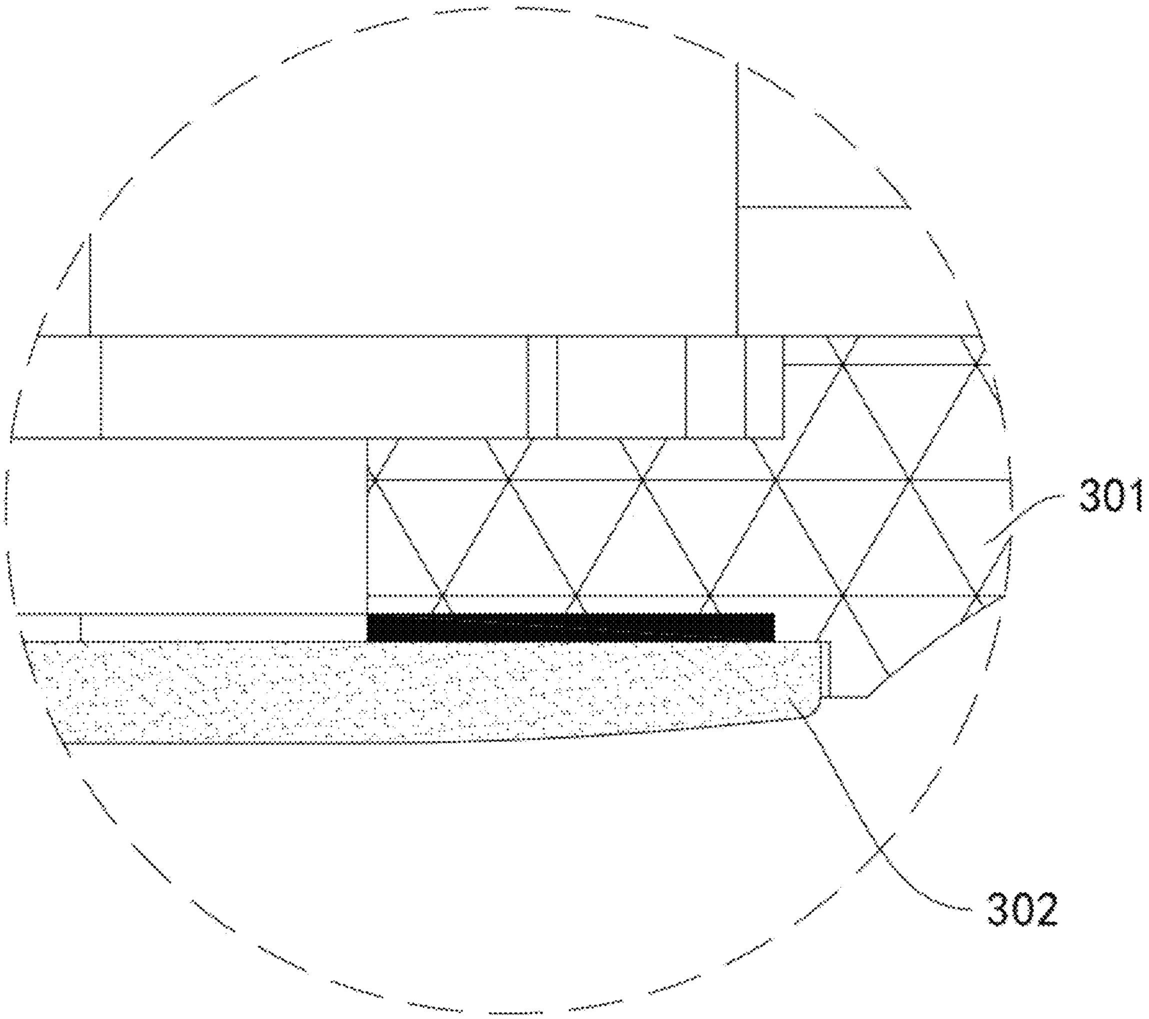
FIG. 10 is an enlarged view of part E of FIG. 10.

Referring to FIGS. 9 and 10, the bottom case 3 includes a case portion 301 and a central portion 302. The central portion 302 is fixedly connected to a middle position of a bottom of the case portion 301. In an embodiment of the present application, material of the case portion 301 is selected as a metal material, and a material of the central portion 302 is selected as a glass lens material. A connection position of the case portion 301 and the central portion 302 is laser treated to render its dyne value greater than 34, with a width of more than 1.5 mm, and the entire surface cannot be interrupted. The molecular atoms on the surface of the central portion 302 are separated by plasma treatment equipment to render the dyne value greater than 34, so that there is a 0.2 mm gap between the case portion 301 and the central portion 302. A fixing between the case portion 301 and the central portion 302 is achieved by filling the 0.2 mm gap with hot melt adhesive.

Referring to FIGS. 3 and 6, a speaker 14 is fixedly provided in the watch case 1. The speaker 14 is electrically connected to the circuit module 4 and plays sound of the watch. The bottom case 3 is provided with a plurality of speaker holes 32 that are penetrated, each of the speaker holes 32 is directly facing to the speaker 14. The bottom case 3 is fixedly provided with a speaker plate 33, which is directly facing to the speaker 14. A shock-absorbing pad 331 is provided between the speaker plate 33 and the bottom case 3. The shock-absorbing pad 331 is fixedly provided on the speaker plate 33, so that when the speaker 14 emits sound, the sound is directly transmitted to an outside, and it is not easy to drive the bottom case 3 to vibrate.

Referring to FIGS. 3 and 6, the watch case 1 is fixedly provided with two connection blocks 15 at two ends along a length direction. Each connection block 15 is provided with an installation hole 151, which is configured to connect with a watchband of the watch.

Figure 11:
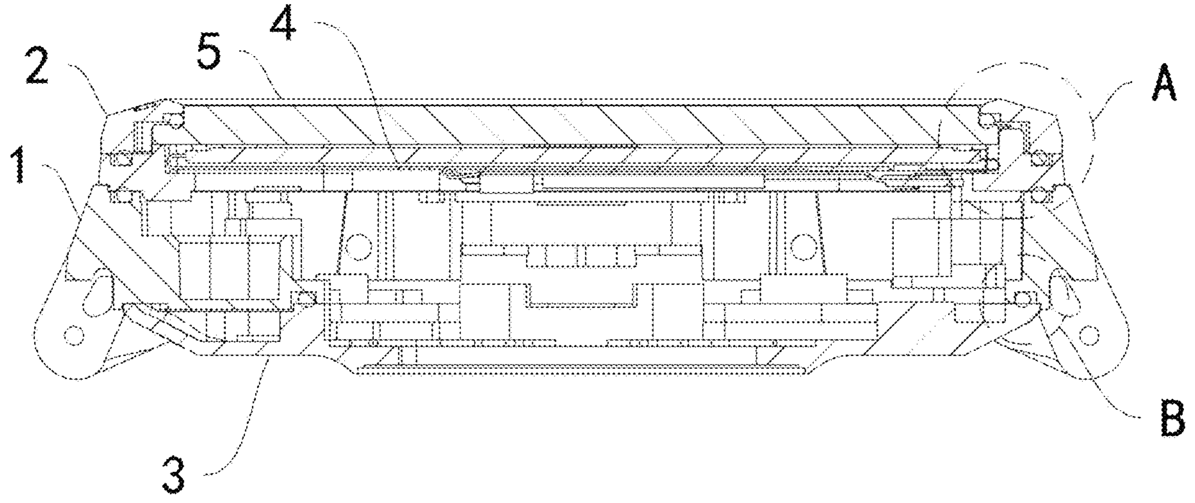
FIG. 11 is a sectional view of an overall structure of an embodiment of the present application.
Figure 12:
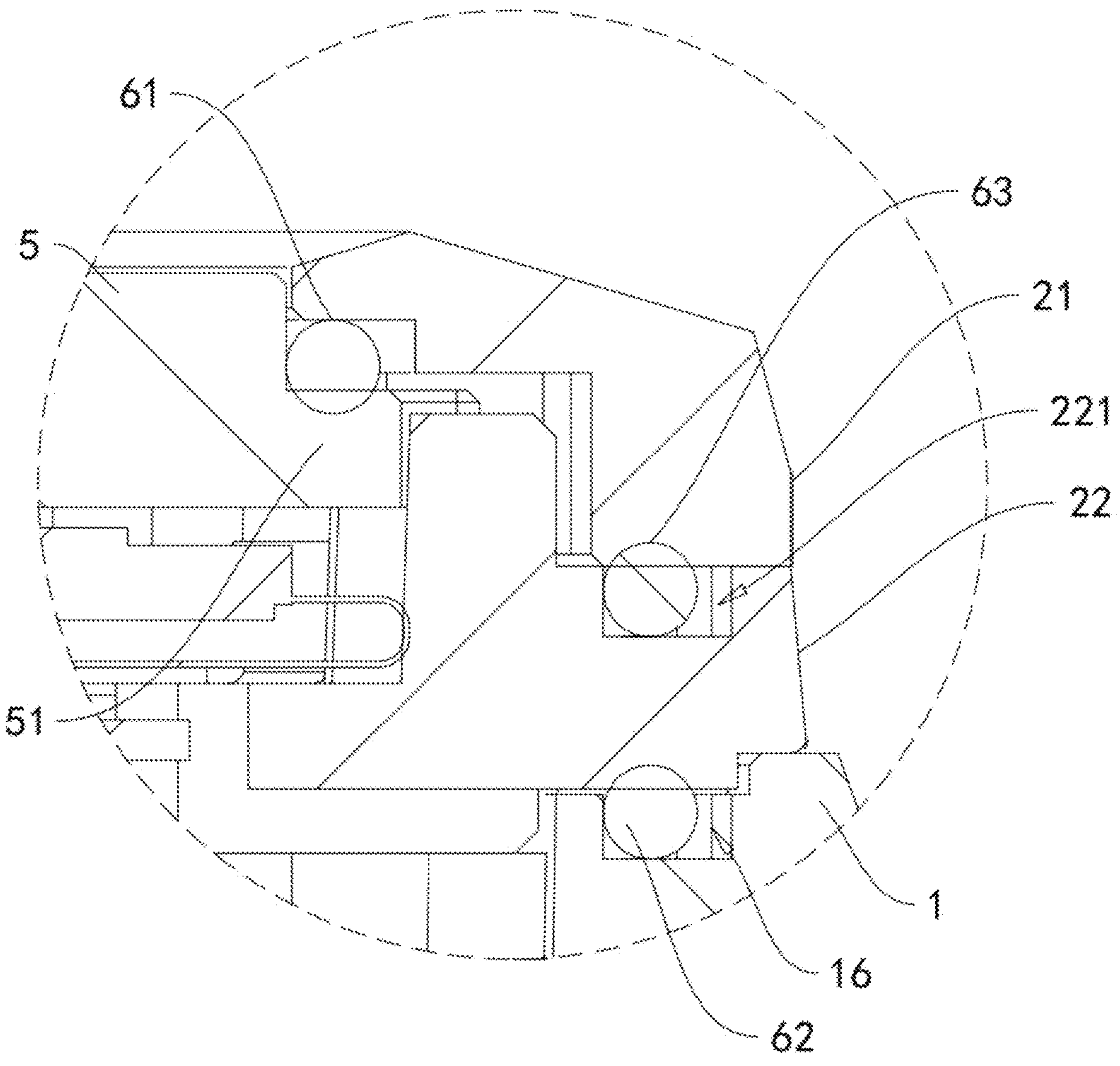
FIG. 12 is an enlarged view of part A of FIG. 11.
Figure 13:
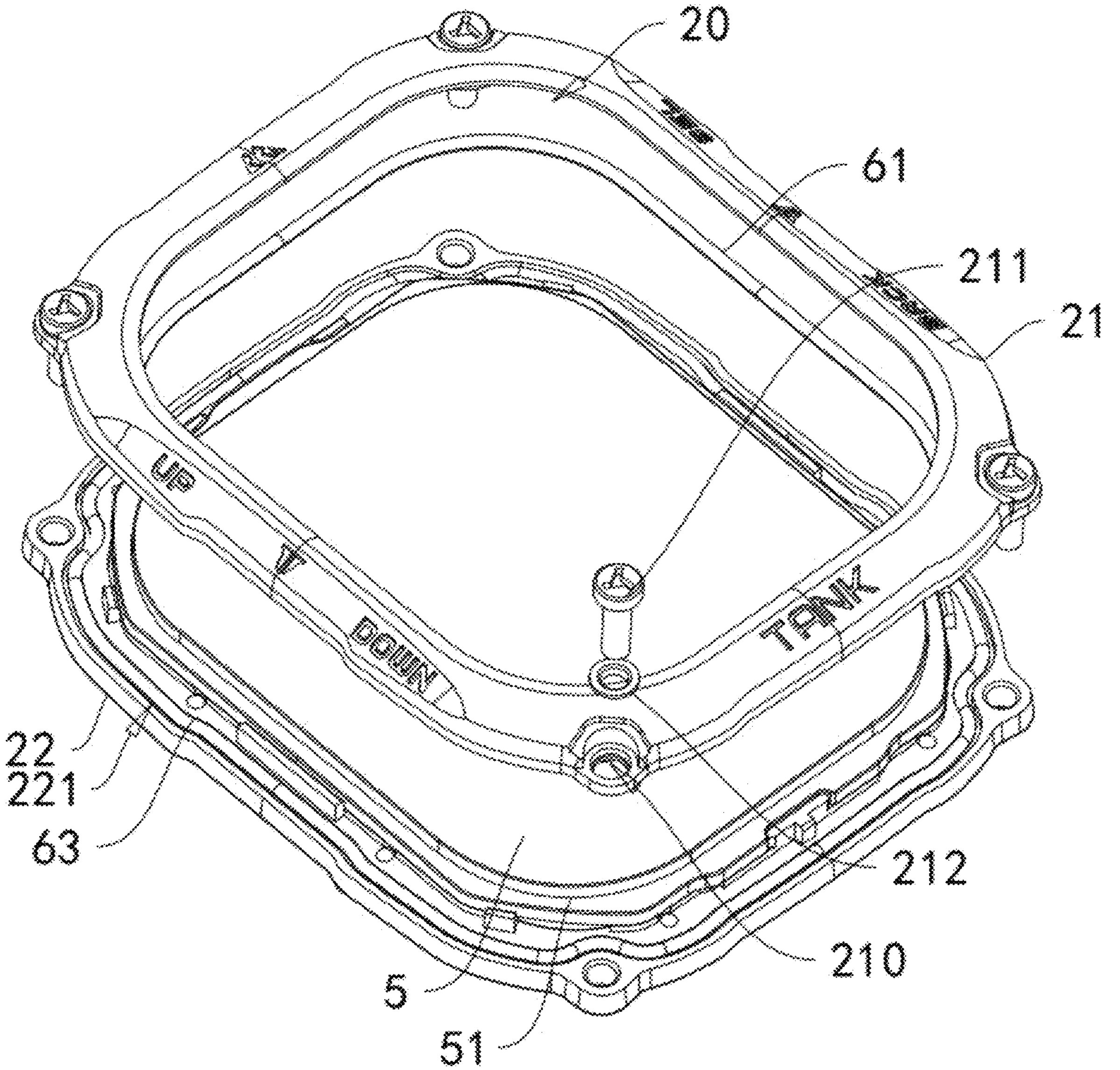
FIG. 13 is an exploded structural view of a watch cover in an embodiment of the present application.
Figure 14:
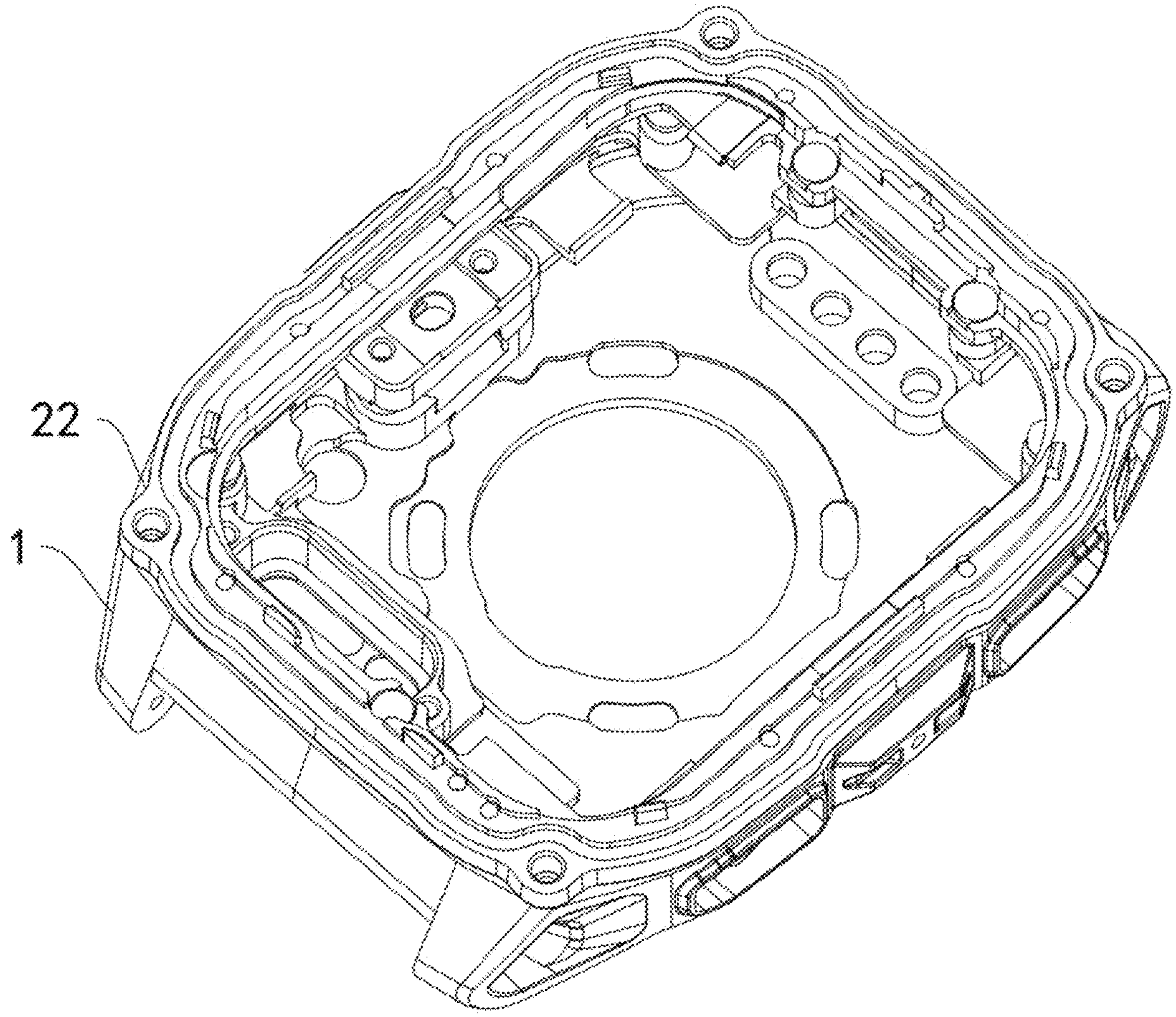
FIG. 14 is a schematic diagram of a connection between a second cover body and the watch case in an embodiment of the present application.

Referring to FIGS. 11, 12, and 13, a display screen 5 is provided between the watch case 1 and the watch cover 2. The display screen 5 is located at a top of the circuit module 4 and is rectangular in shape. A connection ring 51 is fixedly provided on a side of the display screen 5; a thickness of the connection ring 51 is smaller than a thickness of the display screen 5. The connection ring 51 is directly facing to the watch cover 2, and a first sealing ring 61 is fixedly provided between the watch cover 2 and the connection ring 51. The first sealing ring 61 is fixedly provided on the watch cover 2 and abuts against the connection ring 51. A display groove 20 is provided in a middle of the watch cover 2, and the display screen 5 is inserted into the display groove 20. A side of the display screen 5 abuts against a groove body of the display groove 20. Providing the connection ring 51 renders it difficult for moisture to enters the interior of the watch case 1 form a connection position between the watch cover 2 and the display screen 5, thereby further increasing an airtightness of a connection between the watch cover 2 and the display screen 5.

Referring to FIGS. 11, 12, 13, and 14, the watch cover 2 includes a first cover body 21 and a second cover body22. The second cover body22 is located between the first cover body 21 and the watch case 1 and is fixedly connected to the watch case 1 through a plurality of screws. The first cover body 21 is provided with a plurality of fixing holes 210, and each fixing hole 210 is threaded with fixing screws 211. Each fixing screw 211 respectively runs through each fixing hole 210, and each fixing screw 211 passes through the second cover body 22 and is threaded with the watch case 1, so that the first cover body 21 compresses and fixes the second cover body 22 to the watch case 1. Each fixing hole 210 is provided with a protective ring 212. When each fixing screw 211 respectively runs through each fixing hole 210, each fixing screw 211 respectively runs through each protective ring 212 and abuts against each protective ring 212, and each protective ring 212 is respectively wound around each fixing screw 211.

Figure 15:
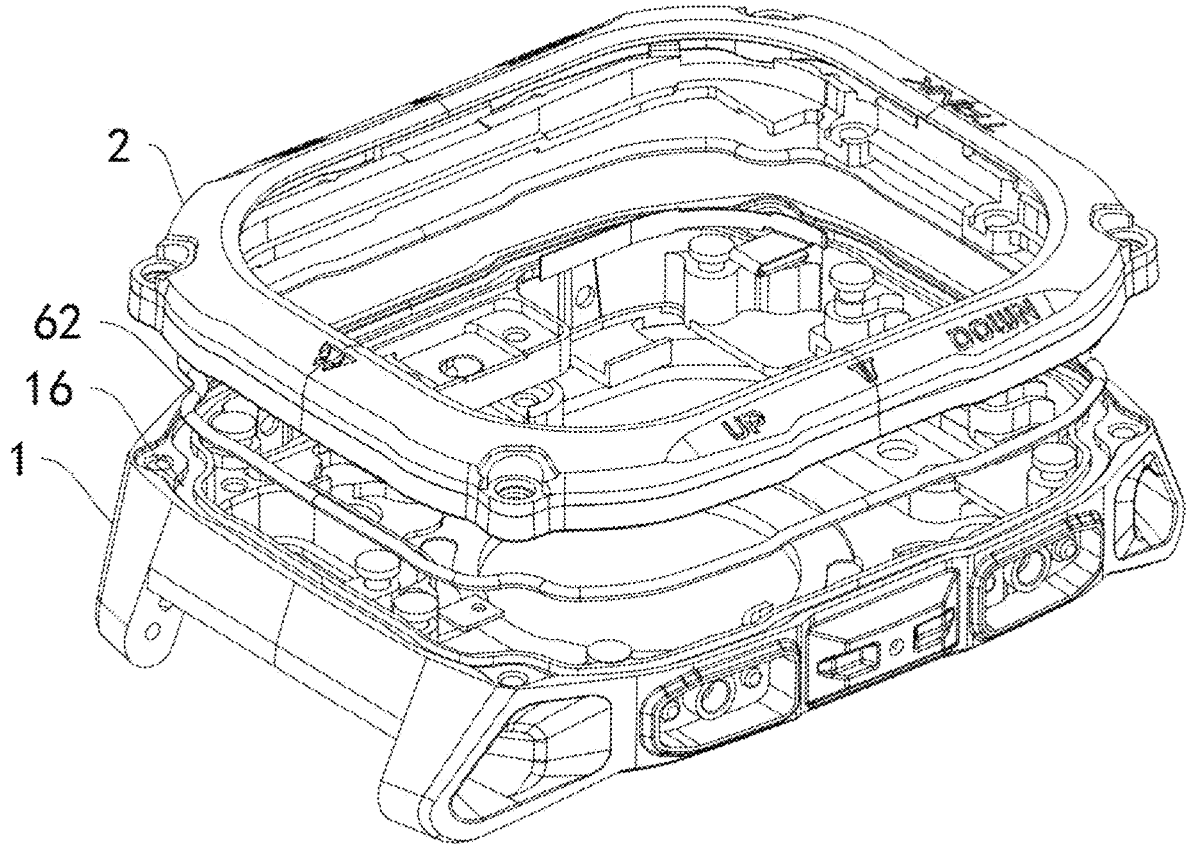
FIG. 15 is a schematic structural diagram of a second sealing ring in an embodiment of the present application.

Referring to FIGS. 11, 12, and 15, a second sealing ring 62 is provided between the watch case 1 and the second cover body 22. A second sealing groove 16 is provided around the watch case 1 on one side of the watch case 1 near the second cover body 22, and the second sealing ring 62 is threaded and engaged with the second sealing groove 16. One side of the second sealing ring 62 that is close to the second cover body 22 abuts against the second cover body 22. Each fixing hole 210 is located an outer side of a groove body of the second sealing groove 16, rendering it difficult for moisture to permeate into the interior of the watch case 1 through the fixing holes 210, thereby further increasing a waterproof performance of the second sealing ring 62 and the waterproof performance of the watch.

Referring to FIGS. 11, 12, 13, and 14, a third sealing ring 63 is provided between the first cover body 21 and the second cover body22. A third sealing groove 221 is provided on a side of the second cover body22 near the first cover body 21, which surrounds the groove along an edge of the second cover body 22. The third sealing groove 221 is directly opposite to the second sealing groove 16. The third sealing ring 63 is inserted and fixed in the third sealing groove 221 and abuts against one side of the first cover body 21 near the second cover body 22.

Figure 16:
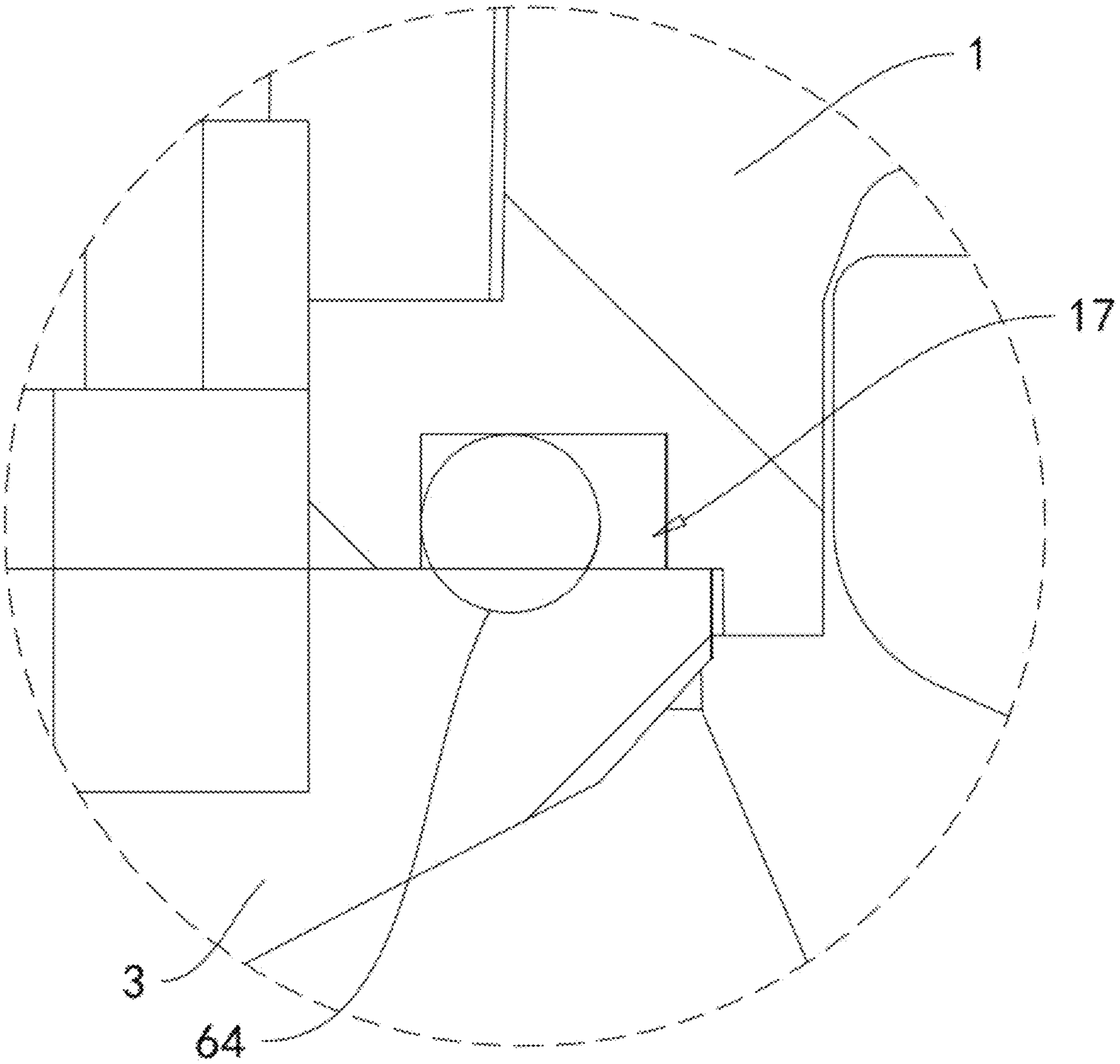
FIG. 16 is an enlarged view of part B of FIG. 11.
Figure 17:
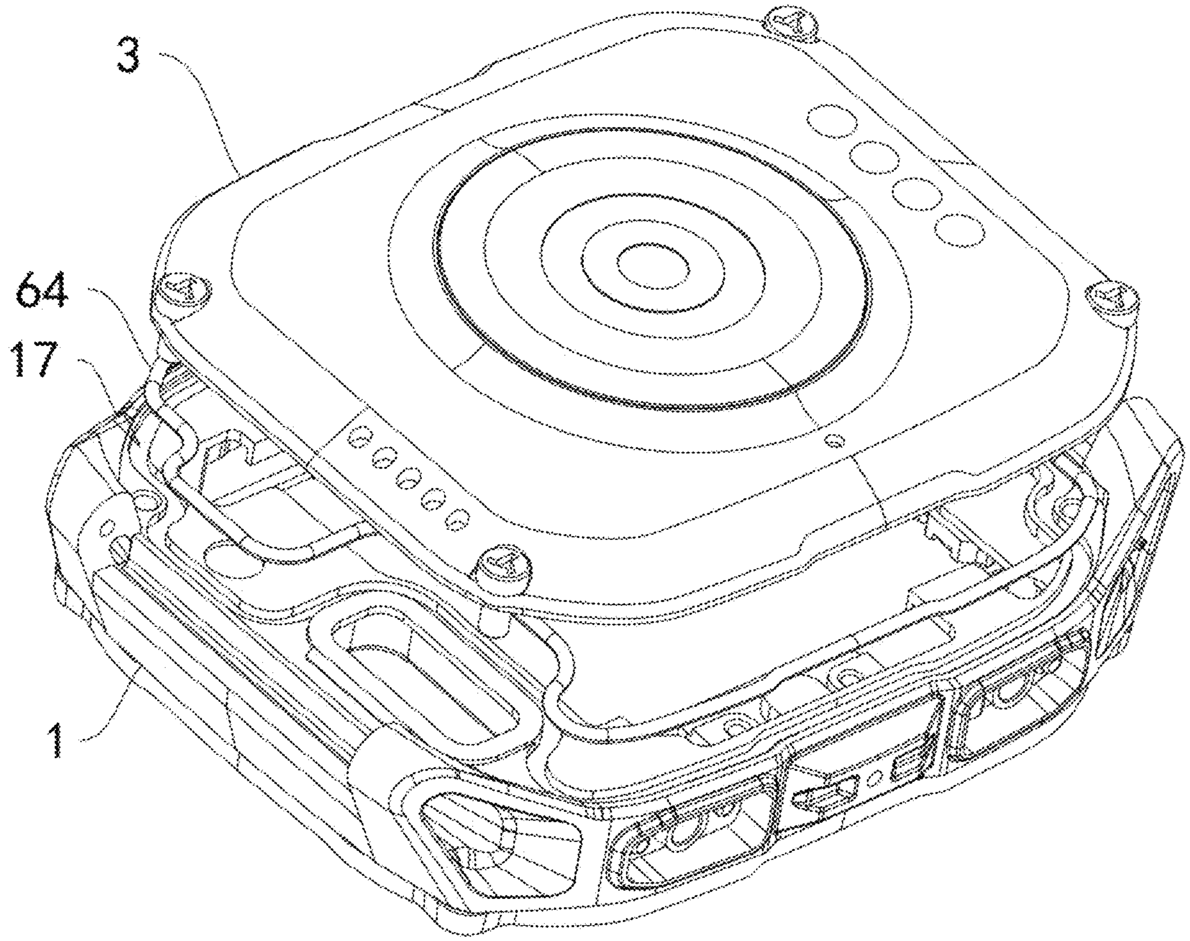
FIG. 17 is a schematic structural diagram of a fourth sealing ring in an embodiment of the present application.

Referring to FIGS. 11, 16, and 17, a fourth sealing ring 64 is provided between the watch case 1 and the bottom case 3. A fourth sealing groove 17 is provided on one side of the watch case 1 near the bottom case 3. The fourth sealing ring 64 is inserted and fixed in the fourth sealing groove 17 and abuts against the bottom case 3. Each speaker hole 32 is located outside the fourth sealing groove 17, thereby further enhancing a waterproof effect of the fourth sealing ring 64.

In an embodiment of the present application, the first sealing ring 61, the second sealing ring 62, the third sealing ring 63, and the fourth sealing ring 64 all have a diameter of 0.9 mm and a hardness of 55 degrees. The first sealing ring 61, the second sealing ring 62, the third sealing ring 63, and the fourth sealing ring 64 are connected without damage, smooth surface and without notches. The first sealing groove, the second sealing groove 16, the third sealing groove 221, and the fourth sealing groove 17 are all U-shaped grooves of 1.1 mm, with a groove depth of 0.6 mm and a smooth and flat surface without notches. Therefore, when in use, the first sealing ring 61, the second sealing ring 62, the third sealing ring 63, and the fourth sealing ring 64 are compressed to 0.6 mm so as to achieve sealing and waterproof.

In an embodiment of the present application, materials of the first sealing ring 61, the second sealing ring 62, the third sealing ring 63, and the fourth sealing ring 64 are all selected as soft liquid silicone, which changes connection ways between the watch case 1, the watch cover 2, and the bottom case 3 from a rigid connection to a flexible connection. Therefore, when the watch falls, the first sealing ring 61, the second sealing ring 62, the third sealing ring 63, and the fourth sealing ring 64 will buffer a relative vibration and instantaneous impact force generated between the watch case 1, the watch cover 2, and the bottom case 3, thereby improving an anti-collision performance of the watch. At the same time, the first sealing ring 61, the second sealing ring 62, the third sealing ring 63, and the fourth sealing ring 64 are combined to form three-dimensional and multi-directional waterproofing of the watch. The waterproofing of the watch is better. Besides that, applying with glue for the waterproof of the watch is transformed to the waterproof of the first sealing ring 61, the second sealing ring 62, the third sealing ring 63, and the fourth sealing ring 64, rendering it easier and more convenient to disassemble the watch.

An implementation principle of the waterproof structure for a watch in the present application is as follows: providing the first sealing ring 61 renders it difficult for moisture to enter an interior of the watch and damage the circuit module 4 through a connection position between the watch cover 2 and the display screen 5, thereby improving an airtightness of a connection between the watch cover 2 and the display screen 5, enhancing an overall waterproof performance of the watch, and improving the waterproof performance only through a tight structural fit of the watch case 1. However, the waterproof sealing between the watch case 1 and the display screen 5 is not easily achieved through structural fit, which renders it easy for moisture to enter the interior of the watch from the connection position between the case and the display screen 5, causing damage to the watch. Furthermore, the connection between the watch cover 2 and the display screen 5 is transitioned through the first sealing ring 61, which renders a soft elasticity of the first sealing ring 61 play a buffering and shock-absorbing role when the watch falls, preventing collision and damage between the watch cover 2 and the display screen 5 due to the watch falling.

The above are preferred embodiments of the present application and do not limit the protection scope of the present application. Therefore, any equivalent changes made according to structure, shape, and principle of the present application should be included in the protection scope of the present application.

What is claimed is:

1. A waterproof structure for a watch, comprising a watch case, a watch cover, a bottom case, and a circuit module;

wherein the watch cover is fixedly provided on one side of the watch case, the bottom case is fixedly provided on the other side of the watch case, and the circuit module is provided within the watch case;

a display screen is provided between the watch case and the watch cover, and a first sealing ring is provided between the watch cover and the display screen;

the first sealing ring is fixedly provided on the watch cover and abuts against the display screen;

wherein the watch cover comprises a first cover body and a second cover body, wherein a second sealing ring is provided between the watch case and the watch cover, and the second sealing ring is fixedly provided on the watch case or the watch cover and abuts against the watch cover or the watch case;

a third sealing ring is provided between the first cover body and the second cover body, and the third sealing ring is fixedly provided on the first cover body or the second cover body and abuts against the second cover body or the first cover body;

a fourth sealing ring is provided between the watch case and the bottom case, and the fourth sealing ring is fixedly provided on the watch case or the bottom case and abuts against the bottom case or the watch case;

the first sealing ring, the second sealing ring, the third sealing ring, and the fourth sealing ring all have a diameter of 0.9 mm and a hardness of 55 degrees;

materials of the first sealing ring, the second sealing ring, the third sealing ring, and the fourth sealing ring are all selected as soft liquid silicone;

the bottom case comprises a case portion and a central portion, a connection position of the case portion and the central portion has a dyne value greater than 34 and has a width of more than 1.5 mm, and the central portion has a dyne value greater than 34.

2. The waterproof structure for a watch according to claim 1, wherein a connection ring is fixedly provided on a side of the display screen, a thickness of the connection ring is smaller than a thickness of the display screen, the first sealing ring abuts against the connection ring, the watch cover is provided with a display groove, and a side of the display screen abuts against a groove body of the display groove.

3. The waterproof structure for a watch according to claim 1, wherein the second cover body is located between the first cover body and the watch case, the second cover body is fixedly connected to the watch case, the first cover body is provided with a plurality of fixing holes, each of the plurality of fixing holes is threaded with fixing screws, each of the fixing screws respectively runs through each of the fixing holes and threaded connected to the watch case, the first cover body presses the second cover body onto the watch case.

4. The waterproof structure for a watch according to claim 3, wherein each of the fixing holes is provided with protective rings, when each of the fixing screws respectively runs through each of the fixing holes, each of the fixing screws respectively runs through each of the protective rings and abuts against each of the protective rings, and each of the protective rings is respectively wound around each of the fixing screws.

5. The waterproof structure for a watch according to claim 3, wherein the watch case or the watch cover is provided with a second sealing groove, the second sealing ring is threaded and engaged with the second sealing groove;

each of the fixing holes is located an outer side a groove body of the second sealing groove.

* * * * *